(12) United States Patent
Cahill et al.

(10) Patent No.: US 6,684,901 B1
(45) Date of Patent: Feb. 3, 2004

(54) MODULAR LIQUID DISPENSING VALVE

(75) Inventors: Brian T. Cahill, Oak Creek, WI (US);
Kevin Reilly, Wauwatosa, WI (US)

(73) Assignee: Deltrol Controls, Milwaukee, WI (US)

( * ) Notice: Subject to any disclaimer, the term of this patent is extended or adjusted under 35 U.S.C. 154(b) by 222 days.

(21) Appl. No.: 09/938,181

(22) Filed: Aug. 23, 2001

(51) Int. Cl.$^7$ .......................... F16K 27/00; F16K 31/02
(52) U.S. Cl. ........................ 137/315.03; 137/15.18; 251/129.15; 251/291; 251/367
(58) Field of Search ............... 137/15.17, 15.18, 137/315.03, 343; 251/129.15, 291, 292, 367; 335/278

(56) References Cited

U.S. PATENT DOCUMENTS

| | | | | |
|---|---|---|---|---|
| 3,917,218 A | * | 11/1975 | Marocco | 251/367 |
| 4,298,020 A | * | 11/1981 | Inada et al. | 251/367 |
| 5,449,227 A | * | 9/1995 | Steinberg et al. | 251/129.15 |
| 5,630,403 A | * | 5/1997 | Van Kampen et al. | 251/129.17 |
| 6,144,275 A | * | 11/2000 | Hirata et al. | 335/262 |
| 6,422,258 B1 | * | 7/2002 | DuHack et al. | 137/315.03 |
| 6,457,484 B1 | * | 10/2002 | Najmolhoda | 137/15.18 |

* cited by examiner

*Primary Examiner*—George L. Walton
(74) *Attorney, Agent, or Firm*—Andrus, Sceales, Starke & Sawall, LLP (57) ABSTRACT

A solenoid valve has a valve body with an inlet and an outlet and a valve seat therebetween. A valve member is selectively engageable with the valve seat for controlling the flow of fluid from the inlet to the outlet. A biasing device is engageable with the valve member for holding the valve member against the valve seat. A solenoid assembly is mounted upon the valve member for moving the valve member away from the valve seat. A mounting arrangement is interposed between and connects the valve body and the solenoid assembly in a rotary, frictional engagement.

35 Claims, 8 Drawing Sheets

MODULAR LIQUID DISPENSING VALVE

FIELD OF THE INVENTION

This invention relates generally to solenoid operated, liquid dispensing valves and, more particularly, pertains to improvements in the assembly and mounting of such valves.

BACKGROUND OF THE INVENTION

Solenoid valves are commonly used to control the flow of infusion water or liquid in hot beverage machines. The typical solenoid valve of this type includes a valve body that defines a valve chamber, and an inlet and an outlet that communicate with the valve chamber. A valve seat is interposed between the inlet and the outlet, and a solenoid operated valve member is adapted to engage the valve seat to permit and prevent flow to the outlet. In the conventional valve, the valve member is biased to a closed position by a spring, and operation of a solenoid will move the valve to an open position.

In such valves, the solenoid is typically held in a fixed position within a C-shaped frame, a mounting bracket is interposed between the bottom of the frame and the top of the valve body and a set of threaded fasteners is employed to hold the assembly together. The assembled valve in its particular configuration is installed by inserting further fasteners through holes in the mounting bracket and threading them into a mounting surface such as on a hot beverage machine. The requisite electric energy is supplied to the solenoid via terminals projecting therefrom.

Although such valves operate generally satisfactorily for their intended purpose, their fixed configuration is not always adaptable to the varying structures upon which they are installed. This necessitates removing the fasteners holding the mounting bracket in place, unscrewing the fasteners which hold the valve assembly together and then replacing the mounting components as required to fit into the existing environment. Such modification requires the valve manufacturer or supplier to stock a large inventory of various components. Once the valve is installed, the solenoid remains fixed relative to its frame such that the position of the terminals cannot be adjusted. This limitation can further complicate the remounting of the valve.

It would be desirable to provide a solenoid valve having assembly and mounting features which avoid the drawbacks of the prior art. More specifically, it would be desirable to provide a modular valve constructed with standardized parts and dimensions to improve variety of use. It would also be desirable to provide a solenoid valve which does not require assembly via tools and threaded fasteners, but can be configured and serviced simply by twisting and untwisting valve components into and out of a snap fit. Likewise, it would be further desirable to provide a solenoid valve wherein the position of the solenoid may be altered once the valve is mounted in place.

SUMMARY OF THE INVENTION

It is a general object of the present invention to provide a solenoid valve having components which may be easily adjusted and assembled without the need for tools and threaded fasteners.

It is one object of the present invention to provide a solenoid valve having twist type mounting components.

It is also an object of the present invention to provide a solenoid valve having rotatable adjustment of a mounting bracket relative to a valve body.

It is a further object of the present invention to provide a solenoid valve having a snap fit subassembly of a frame, a solenoid and a snap plate.

It is another object of the present invention to provide a solenoid valve having the subassembled frame, solenoid and snap plate adjustably mounted relative to the mounting bracket and the valve body.

It is an additional object of the present invention to provide a solenoid valve having a solenoid which is adjustably mounted for rotation relative to a frame.

In one aspect of the invention, a solenoid valve has a valve body with an inlet and an outlet and a valve seat therebetween. A valve member is selectively engageable with the valve seat for controlling the flow of fluid from the inlet to the outlet. A biasing device is engageable with the valve member for holding the valve member against the valve seat. A solenoid assembly is mounted upon the valve member and the valve body for moving the valve member away from the valve seat. The invention is improved by means of a mounting arrangement interposed between and connecting the valve body and the solenoid assembly in a rotary, frictional engagement. The mounting arrangement includes a mounting bracket positioned upon the valve body, and a snap plate located between the solenoid assembly and a mounting bracket. The mounting arrangement is free of threaded fasteners. The solenoid assembly includes a solenoid and a frame for movably holding the solenoid, the frame being attached to the snap plate. The valve body includes attachment structure for permitting joinder of the mounting bracket, the snap plate and the solenoid assembly. The mounting bracket includes engagement structure cooperable with the attachment structure on the valve body. The snap plate includes leg and pin structure passable through the engagement structure on the mounting bracket and engageable with the attachment structure on the valve body. The frame includes notch structure for defining various rotational positions for the solenoid. The solenoid has detent structure selectively engageable with the notch structure on the frame.

In another aspect of the invention, a modular, solenoid operated, liquid dispensing valve includes a valve body having an inlet and an outlet for respectively introducing liquid into and delivering liquid out of the solenoid valve, and a valve seat between the inlet and the outlet. A valve member is selectively engageable with the valve seat for controlling the flow of fluid from the inlet to the outlet. A biasing device is engageable with the valve member for holding the valve member against the valve seat. A solenoid assembly is mounted upon the valve body for selectively moving the valve member in a direction away from the valve seat. A mounting bracket is positioned between the valve body and the solenoid assembly for supporting the solenoid assembly thereon whereby at least the mounting bracket is removably connected to the valve body by a twist, snap fit. The solenoid assembly is also removably connected to the valve body by a twist, snap fit. The solenoid assembly includes a solenoid, a frame for holding the solenoid and a snap plate attached to the frame. The valve body includes an open upper end terminating in a neck having a radially extending crown provided with a raised surface arrangement in the form of a series of lands located on an outer perimeter of the crown, each land having a ridge at one end running along the neck, and a narrow wall at another end extending from the neck to the outer perimeter. Each ridge on the valve body includes an L-shaped, mounting bracket receiver rising above the neck. The raised surface arrangement includes a series of spaced apart cavities, each cavity being formed by surrounding surfaces of each land, ridge and narrow wall, each cavity having an expanded end and a narrowed end. A nook is provided between each ridge and each narrow wall to facilitate securement of the mounting bracket to the valve body. A flat is provided between each adjacent pair of lands outwardly of each ridge. The mounting bracket has an attachment portion and a base integrally formed therewith, the base being formed with a central void in registration with the open upper end of the valve body. The base includes a set of curved guide slots and a group of pockets for enabling attachment of the solenoid assembly. The base further includes radially innermost, neck encircling surfaces between the slots and the central void, each of the innermost surfaces being formed with a dimple frictionally engageable in a respective nook upon rotation of the mounting bracket relative to the valve body. Each of the pockets has an enlarged end and an opposite niched end movable into engagement with a respective L-shaped mounting bracket receiver on the valve body. Each L-shaped mounting bracket receiver and each ridge form a slot for receiving the niched end of each pocket upon rotation of the mounting bracket relative to the valve body. The cavities of the valve body crown are aligned with the pockets in the mounting bracket. The flats on the valve body crown are in registration with the curved guide slots in the mounting bracket. The snap plate includes a set of locating pins depending therefrom, each locating pin having a top end provided with a tang having a ramping surface. The snap plate also includes a group of attachment legs depending therefrom, each leg having a length greater than a length of the locating pins, each leg having a barbed lower end engageable with the valve body. The attachment legs on the snap plate are inserted through the enlarged ends of the mounting bracket pockets and the expanded ends of the valve body cavities which are aligned with the pockets, and the locating pins are positioned in leading ends of the mounting bracket curved guide slots for movement over the aligned valve body flats. The attachment legs on the snap plate are movable into frictional engagement with walls on the narrowed ends of the cavities upon rotation of the snap plate relative to the mounting bracket. The snap plate has a central bore aligned with the mounting bracket central void and the open upper end of valve body. The frame has a bottom end plate, a top end plate and a connector plate joining the bottom end plate and the top end plate. The bottom end plate is formed with a plurality of recesses for receiving the tang ramping surfaces of the snap plate locating pins such that the tangs will be snap fit against the wall surfaces forming the recesses. The top end plate is formed with a plurality of notches, and the solenoid is provided with a nib which is received in one of the notches. The solenoid is rotatably mounted on the bottom end plate and the top end plate of the frame. A spring washer is interposed between a bottom of the solenoid and an upper surface of the bottom end plate, the spring washer providing a force tending to hold the nib in one of the notches, the force being overcome to enable the nib to be positioned in another of the notches so as to vary the rotational position of the solenoid relative to the frame.

The invention further contemplates a method of assembling a solenoid valve comprising the steps of a) providing a valve body having an inlet and an outlet for controlling fluid through the valve body, and a valve seat between the inlet and the outlet; b) providing a valve member selectively engageable with the valve seat for controlling flow of fluid from the inlet to the outlet; c) providing a biasing device engageable with the valve member for holding the valve member against the valve seat; d) providing a solenoid assembly mounted upon the valve body for selectively moving the valve member in a direction away from the valve seat, the solenoid assembly including a solenoid and a frame for holding the solenoid therein; e) providing a mounting bracket to be positioned between the valve body and the solenoid assembly; f) connecting the mounting bracket to the valve body by means of a first twisting, snap fit; and g) connecting the solenoid assembly to the mounting bracket and the valve body by means of a second twisting snap fit, whereby rotational position of the mounting bracket relative to the valve body and rotational position of the solenoid assembly relative to the valve body and the mounting bracket are variably adjustable. The method includes the step of rotatably mounting the solenoid relative to the frame, the mounting bracket and the valve body.

Various other features, objects and advantages of the invention will be made apparent from the following description taken together with the drawings.

BRIEF DESCRIPTION OF THE DRAWINGS

The drawings illustrate the best mode presently contemplated at carrying out the invention.

In the drawings.

DETAILED DESCRIPTION OF THE INVENTION

Referring now the drawings, there is shown a solenoid operated, liquid dispensing valve 10 embodying the present invention. Valve 10 has particular utility in beverage or liquid dispensing machines, such as for example, coffee making machines, soup machines, rug cleaning machines, ice making machines and the like. As will be appreciated hereafter, valve 10 is an assembly free of threaded fasteners which enables the components of the valve to assume various configurations as required by extant mounting environment by means of a twisting, snap fit.

Figure 1:
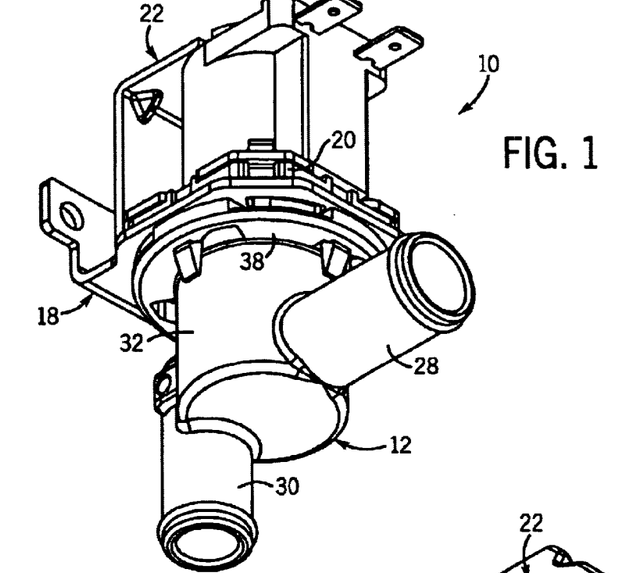
FIG. 1 is a bottom isometric view of a solenoid operated, liquid dispensing valve embodying the present invention.
Figure 2:
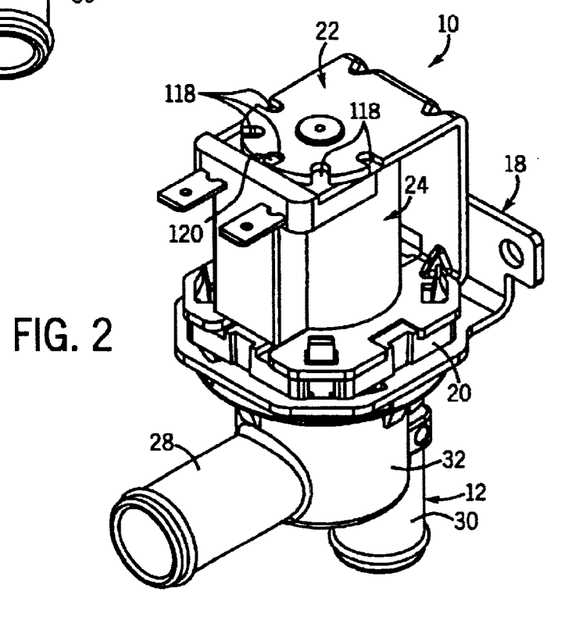
FIG. 2 is a top isometric view of the liquid dispensing valve shown in FIG. 1.
Figure 3:
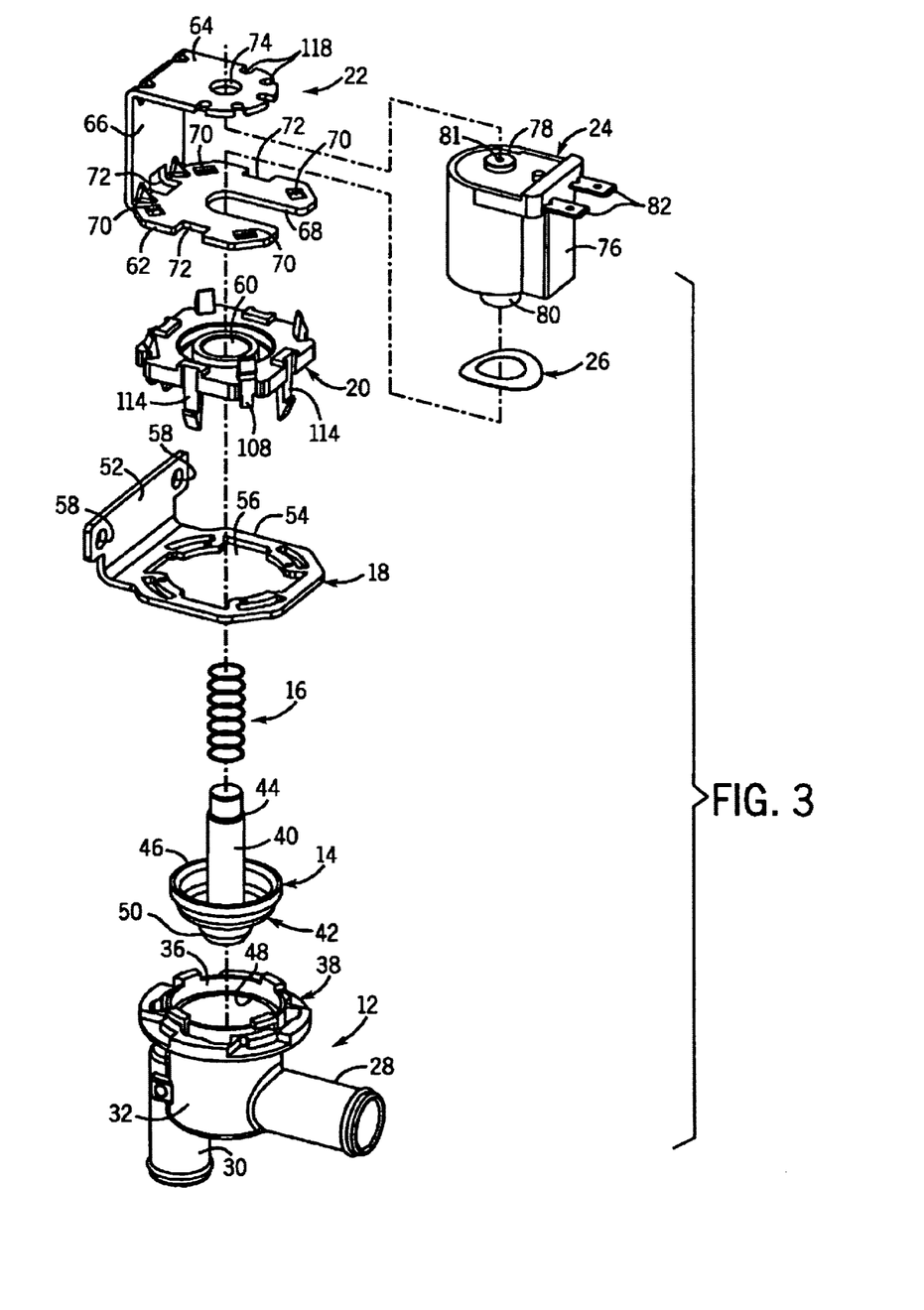
FIG. 3 is a vertically exploded view of the liquid dispensing valve shown in FIGS. 1 and 2.

As seen in FIGS. 1 through 3, valve 10 is comprised of a valve body 12, a valve member 14, a coil spring 16, a mounting bracket 18, a snap plate 20, a solenoid frame 22, a solenoid 24 and a spring washer 26.

Valve body 12 is preferably formed of a plastic or nylon material and includes a horizontally extending inlet 28 and a vertically extending outlet 30 disposed at generally 90 degrees with respect to inlet 28. Valve body 12 also defines a generally cylindrical valve chamber 32 which is located between inlet 28 and outlet 30. A proximal end of inlet 28 is formed with a circular valve seat 34 (FIG. 5) which opens into the center of valve chamber 32. Liquid introduced through the inlet 28 flows through the valve seat 34 and exits through the outlet 30. The valve chamber 32 is closed at a bottom end and open at the top which terminates in a neck 36. Extending radially outwardly from the neck 36 is a circular crown 38 provided with attachment structure for permitting joinder of the remaining valve components to the valve body 12 as will be detailed below.

Valve member 14 includes an elongated, cylindrical plunger 40 having a lower end which is attached to a flexible diaphram 42, and an upper end formed with an inset shoulder 44 for supporting the lower end of spring 16. Diaphram 42 has an upper peripheral edge with a flange 46 adapted to engage an inwardly extending rim 48 running around the interior of the neck 36. In addition, the diaphram 42 has a plug-like bottom 50 engageable with the valve seat 34 to provide a seal. The plunger 40 and coil spring 16 extend upwardly through the mounting bracket 18, snap plate 20 and frame 22 into the interior of the solenoid 24. The plunger 40 is designed to move up and down in response to energization and deenergization of solenoid 24.

Mounting bracket 18 has a vertically extending attachment portion 52 integrally formed with a horizontally extending base 54 having a central void 56 formed therein. The attachment portion 52 is provided with a pair of holes 58 for receiving suitable fasteners which are threaded into a mounting surface for supporting the assembled valve. The base 54 is formed with engagement structure which facilitates a quick adjustable connection with the valve body 12, the snap plate 20, the frame 22 and the solenoid 24 as will be discussed below.

Snap plate 20 is disposed on top of mounting bracket 18 and includes leg and pin structure which is adjustably received in the engagement structure of the mounting bracket base 54. Snap plate 20 is also provided with a central bore 60 which is aligned with the central void 56 in the mounting bracket 18 and the open top of valve body 12.

Frame 22 is generally C-shaped and includes a bottom end plate 62 and a top end plate 64 joined by a connector plate 66. Bottom end plate 62 has a U-shaped slot 68 aligned with the snap plate bore 60, the mounting bracket central void 56 and the open top of valve body 12. Bottom end plate has a set of four rectangular recesses 70 formed in its corners which are adapted to be engaged with the snap plate 20 as will also be described. Bottom end plate 62 also has an array of three relief cutouts 72 removed from its periphery. The top end plate 64 has a hole 74 to facilitate mounting of the solenoid 24 and has notch structure to allow limited rotational adjustment of the solenoid 24.

Solenoid 24 includes a coil assembly 76 provided with an interior passageway having a button-like backstop 78 at its top end and an annular extension 80 at its lower end. The backstop 78 is retained in the hole 74 of top end plate 64 and is formed with a small aperture 81 to release air from the passageway during plunger movement. The aperture 81 also aids in preventing corrosion of the plunger 40. The annular extension 80 projects into the central bore 60 in snap plate 20. The annular extension 80 is surrounded by the spring washer 26 which is placed between the bottom of the solenoid 24 and the upper surface of the bottom end plate 62 in frame 22. The top end of the spring 16 extends into passageway and is adapted to engage the backstop 78. Suitable terminals for connection of electrical leads project outwardly from the upper end of solenoid 24. The upper end of the solenoid 24 carries detent structure cooperable with the notch structure on the top end plate 64 of frame 22 for a purpose to be understood later.

As is well known, the force of coil spring 16 will normally urge the valve member 14 to a closed position such that the diaphram 42 seals off the valve seat 34 preventing flow from the inlet 28 to the outlet 30. Energization of the solenoid 24, however, will cause the plunger 40 and diaphram 42 to be pulled upwardly to an open position so that flow between the inlet 28 and the outlet 30 may occur. With deenergization of the solenoid 24, the coil spring 16 will again force the diaphram 42 back into the closed position.

The present invention provides a valve 10 having unique mounting and assembly features which permit the components of the valve to be assembled in various configurations without the use of any tools or threaded fasteners. The structure which provides for these mounting and assembly features will now be addressed.

Figure 5:
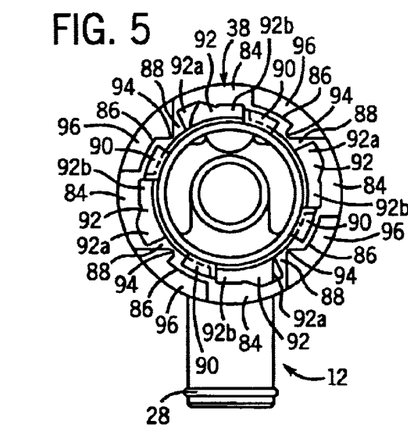
FIG. 5 is a plan view of the valve body employed in the liquid dispensing valve.

Referring now to FIG. 5, the attachment structure on the top of valve body crown 38 is comprised of a continuous, raised surface arrangement having a series of four spaced apart lands 84 located on the outer perimeter of crown 38. Each land 84 has a ridge 86 at one end running along neck 36, and a narrow wall 88 at another end extending from the neck 36 to the outer perimeter. Rising from the junction between each land 84 and each ridge 86 is an L-shaped mounting bracket receiver 90 which extends above the neck 36. A cavity 92 for receiving leg structure on the snap plate 20 is formed by the surrounding surfaces of each land 84, ridge 86 and narrow wall 88. Each cavity 92 is expanded on one end 92a and narrowed on another end 92b to receive and secure leg structure on the snap plate 20. A nook 94 is provided between each ridge 86 and each narrow wall 88 to facilitate securement of the mounting bracket 18 which overlies the crown 38. Between each adjacent pair of lands 84 outwardly of each ridge 86 is a flat 96 which includes the nook 94.

Figure 6:
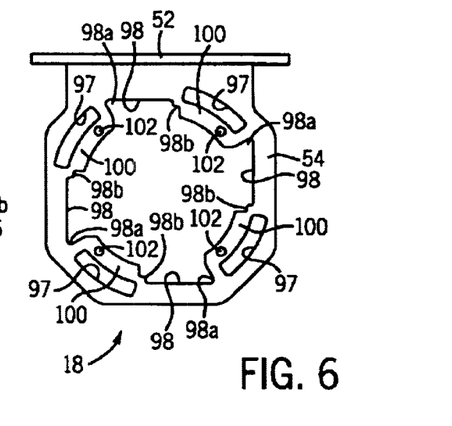
FIG. 6 is a plan view of the mounting bracket employed in the liquid dispensing valve.

Turning to FIG. 6, the engagement structure on the base 54 of mounting bracket 18 includes a set of four guide slots 97 and a group of four pockets 98 for enabling the attachment of superposed snap plate 20. Each of the pockets 98 has an enlarged end 98a for accepting the leg structure on the snap plate 20, and an opposite niched end 98b adapted to be moved into engagement with an L-shaped receiver 90 on valve body 12. Radially innermost surface areas 100 on the base 54 are stamped with four depressions 102 so as to form downwardly depending dimples 104 (FIGS. 8A and 8B) employed to snap fit the mounting bracket 18 in place on the valve body 12.

Figure 7A:
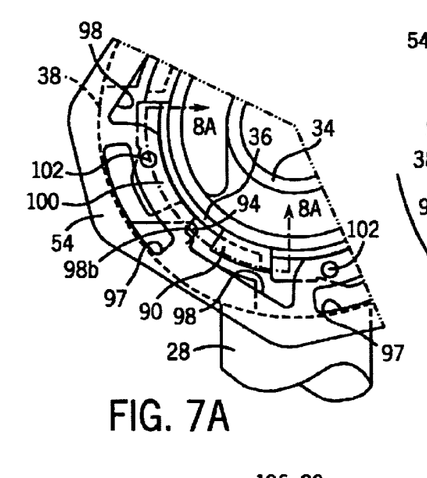
FIGS. 7A and 7B are enlarged, partial, diagramatic views showing the manner in which the mounting bracket is attached to the valve body.
Figure 7B:
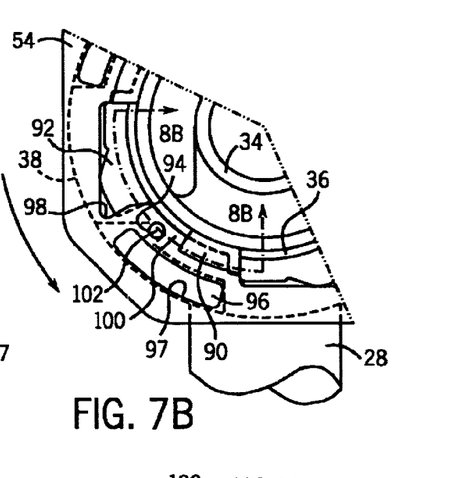
Figure 8A:
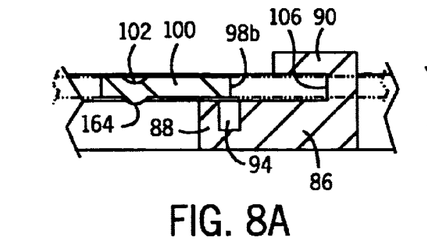
FIGS. 8A and 8B are partial, sectional views taken on lines 8A—8A and 8B—8B of FIGS. 7A and 7B, respectively.
Figure 8B:
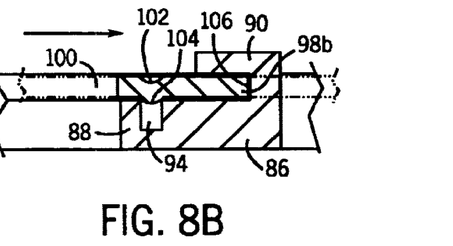

As seen in FIGS. 7A and 8A, the mounting bracket base 54 is positioned upon the raised surface arrangement on the crown 38 of valve body 12 such that the radially innermost surface areas 100 encircle the valve body neck 36 and the L-shaped receivers 90 on the valve body 12 are disposed in the pockets 98. The mounting bracket 18 is then twisted or rotated counterclockwise in the direction of arrow in FIGS. 7B and 8B enabling the radially innermost surface areas 100 and the niched ends 98b to be received in slots 106 formed by the ridges 86 and the receivers 90. At the same time, rotational movement of the base 54 will cause the dimples 104 to ride over the narrow walls 88 and snap into the nooks 94 on the valve body 12 so as to hold the mounting bracket 18 in the desired position thereon. As a result of this twist, snap fit construction, it can be appreciated that the mounting bracket 18 can be quickly positioned at 90 degree increments relative to the valve body 12 so that the attachment portion can be utilized to secure the valve body 12 according to the prevailing mounting structure on the particular dispensing machine. Previously, this would have required a manufacturer to stock at least four different valve body-mounting bracket subassemblies. This construction also allows the mounting bracket 18 to be used with differently fabricated valve bodies. With the mounting bracket 18 secured to the valve body 12 (FIGS. 7B and 15), the cavities 92 on valve body crown 38 are in alignment with the pockets 98 on mounting bracket 18, and the flats 96 formed on the valve body crown 38 are in registration with the curved guide slots 97 in mounting bracket 18.

Figure 9:
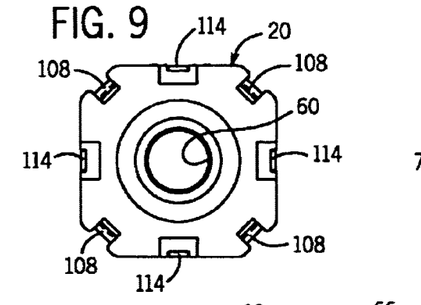
FIG. 9 is a plan view of the snap plate employed in the liquid dispensing valve.
Figure 10:
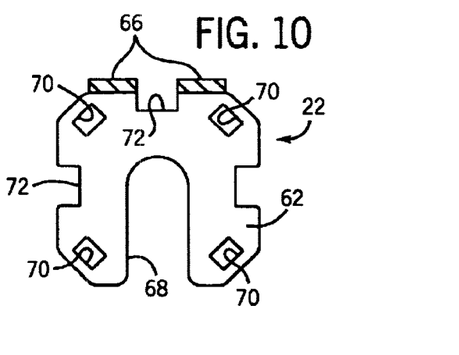
FIG. 10 is a plan view of a bottom end plate of a frame employed in the liquid dispensing valve.
Figure 11:
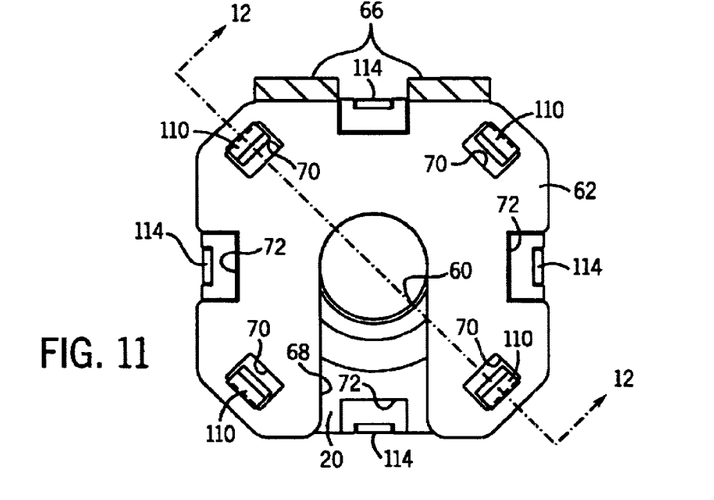
FIG. 11 is an enlarged plan view of the bottom end plate of the frame snap fit with the snap plate.
Figure 12:
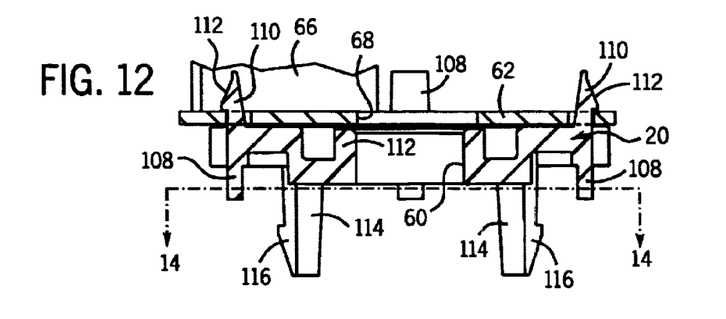
FIG. 12 is a sectional view taken on line 12—12 of FIG. 11.
Figure 13:
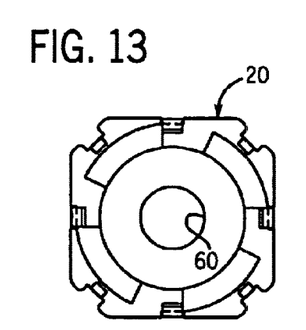
FIG. 13 is a bottom view of the snap plate.
Figures 14, 15, 16A, 16B:
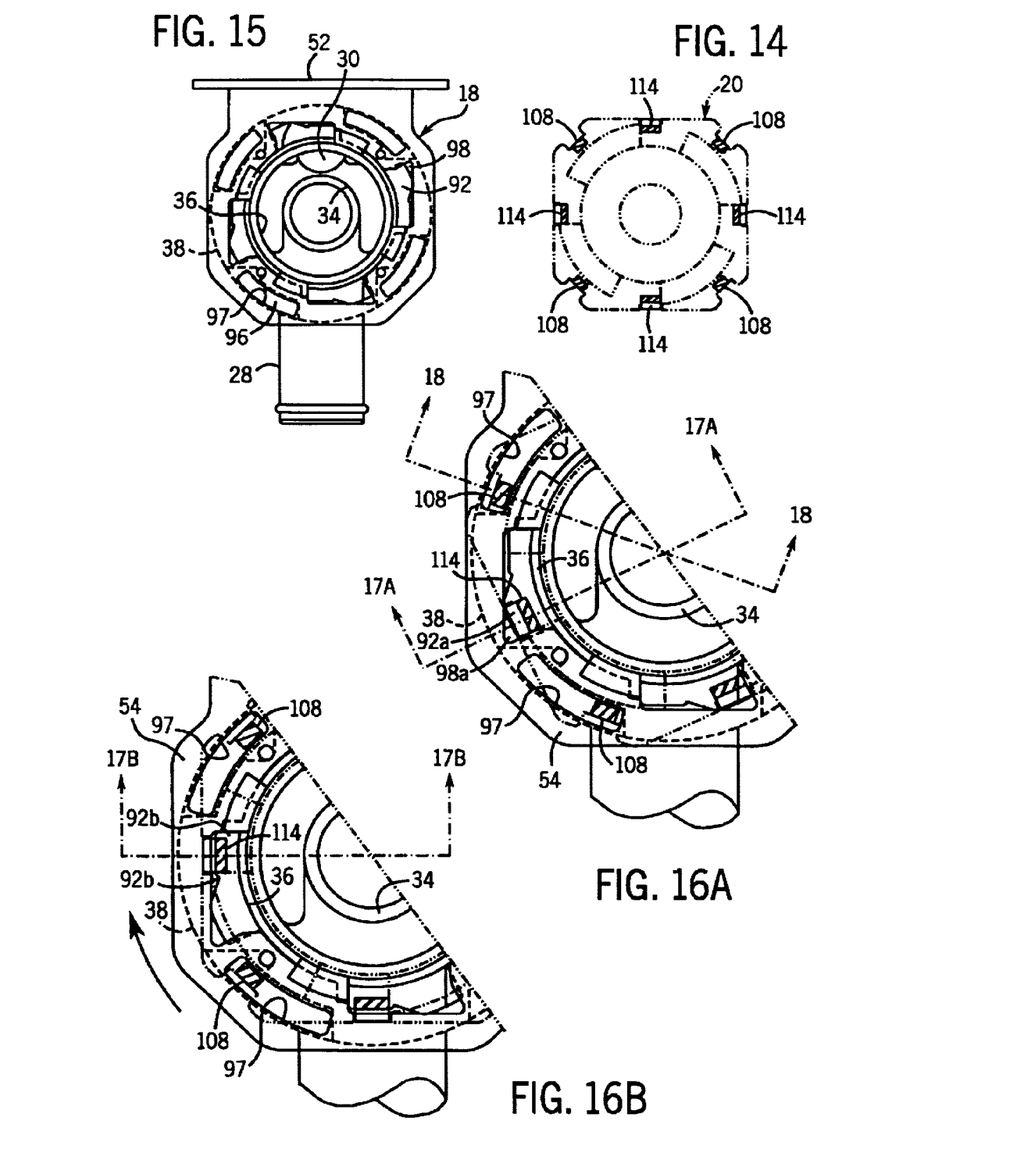
FIG. 14 is a sectional view taken on line 14—14 of FIG. 12.
FIG. 15 is a plan view of the valve body and the mounting bracket assembled together.
FIGS. 16A and 16B are enlarged partial diagramatic views showing the manner in which the valve body and the mounting plate are assembled together with the snap plate.

Snap plate 20 illustrated in FIGS. 9, 13 and 14 is formed at its four corners with pin structure in the form of locating pins 108, the top end of each being provided with a spring-like, tang 110. Each tang 110 has a ramping surface 112. (FIG. 12) which is passed through one of the recesses 70 on the frame bottom end plate 62 (FIG. 10) until the underside of the tang 110 springs outwardly into engagement with the outermost walls forming the recesses 70 on the upper surface of the bottom end plate 62. The locating pins 108 have a length which extends slightly beneath a circular boss 112 depending from the snap plate 20. Depending from the snap plate between each pair of locating pins 108 at each cut out 72 is a leg structure in the form of an attachment leg 114 which extends below the length of each locating pin 108. Each leg 114 has a barbed, lower end 116 which is engageable with the valve body crown 38.

Figure 17A:
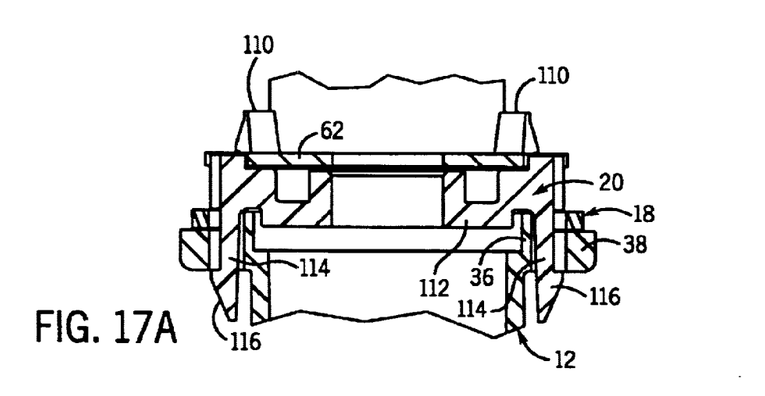
FIGS. 17A and 17B are partial sectional view taken on lines 17A—17A and 17B—17B of FIGS. 16B and 16B, respectively.
Figure 17B:
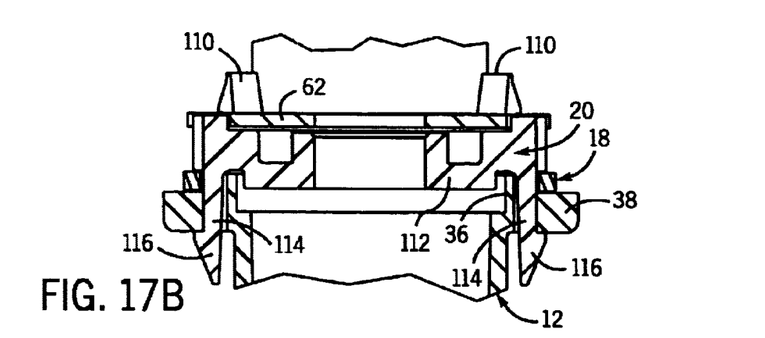
Figure 18:
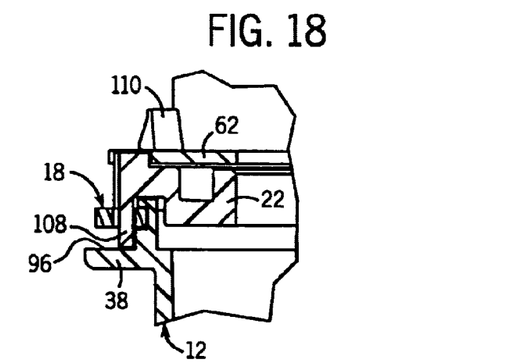
FIG. 18 is a partial sectional view taken on line 18—18 of FIG. 16A.

In FIG. 16A, it is assumed that snap plate 20 has been connected to the bottom end plate 62 and the remainder of frame 22 which holds solenoid 24 as described above. That is, the snap plate 20, the frame 22 and the solenoid 24 generally define a subassembly which is attached at various positions relative to the valve body 12 and the mounting bracket 18. To install the subassembly upon the valve body 12 and the mounting bracket 18, the attachment legs 114 on the snap plate 20 are inserted through the enlarged and expanded ends 98a, 92a of the aligned mounting bracket pockets 98 and the valve body cavities 92. Simultaneously, the locating pins 108 on the snap plate 20 are positioned in leading ends of the mounting bracket curved slots 97 for movement over the aligned valve body flats 96, and the circular boss 112 on the bottom of snap plate 20 is received within the valve body neck 38. FIGS. 17A and 18 show the various disposition of the frame 22, snap plate 20, mounting bracket 18 on the valve body 12 with the pins 108 and the legs 114 in place. As seen in FIG. 16B, the snap plate 20 and the connected frame 22 and solenoid 24 are then twisted or rotated clockwise in the direction of the arrow so that the attachment legs 114 move from the ends 98a, 92a of the aligned mounting bracket pockets 98 and the valve body cavities 92 to the niched and narrowed ends 98b, 92b of the pockets 98 and the cavities 92 where they are frictionally snapped into place with the walls of the narrowed cavities 92. FIG. 17B illustrates that once the attachment legs 114 have snapped into position, their barbed lower ends 116 tightly engage the underside of valve body crown 38. The finished assembled valve 10 is best shown in FIGS. 1 and 2.

Figures 19, 21:
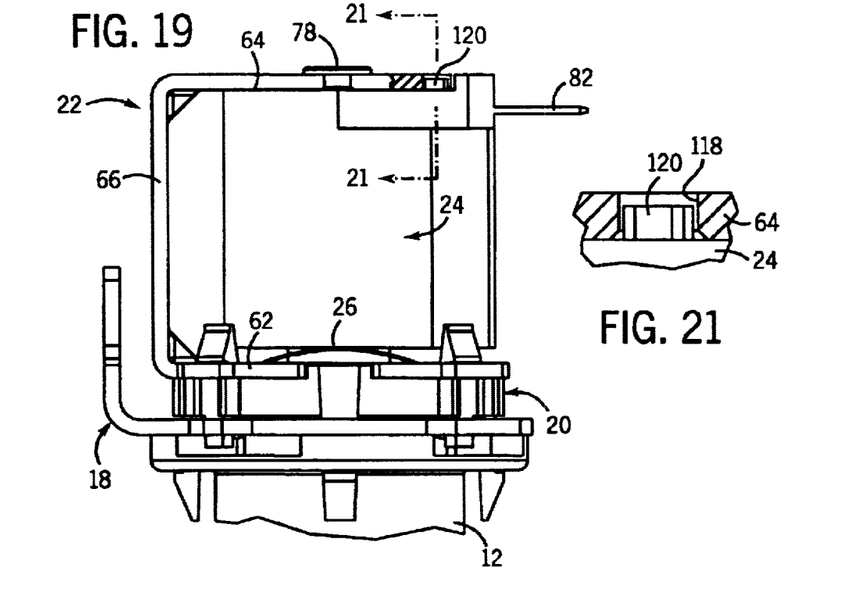
FIGS. 19 and 20 are elevational views of the fully assembled liquid dispensing valve showing the manner in which the position of the solenoid may be rotationally adjusted.
FIG. 21 is a partial sectional view taken on line 21—21 of FIG. 19.
Figures 20, 22:
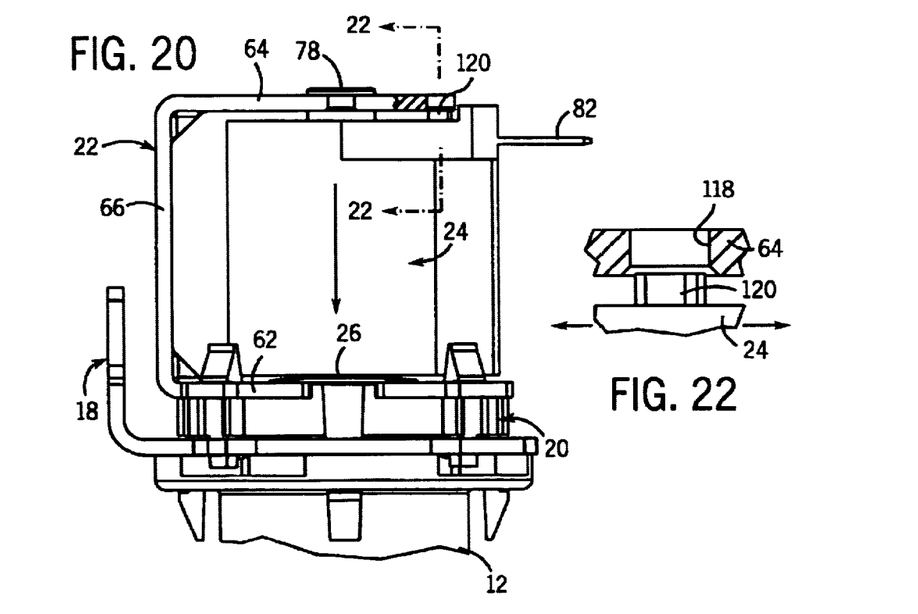
FIG. 22 is a partial sectional view taken on line 22—22 of FIG. 20.

The present invention also contemplates a limited rotational adjustment of the solenoid 24 relative to the frame 22. As previously mentioned, the top end plate 64 of frame 22 has notch structure in the form of a set of preferably five notches 118 (FIGS. 2 and 3) spaced apart at generally 36 degree increments on the front curved end of the top end plates 64. These notches 118 are selectively engageable with detent structure in the form of a projecting nib 120 on the upper end of solenoid 24. FIG. 19 shows the spring washer 26 interposed between the bottom end of the solenoid 24 and the upper surface of the bottom end plate 62. The spring washer mounting permits the solenoid 24 to be temporarily pressed down against the force of the spring washer 26 so that the nib 120 can disengage from its current notch 118 (FIG. 21) and the solenoid 24 can be rotated about the backstop 78.to any of the other notches 118 as depicted in FIG. 22. As a result of this feature, the position of the solenoid terminals 82 may be rotated in the frame 22 as desired to fit the particular application.

Figures 4A, 4B, 4C, 4D:
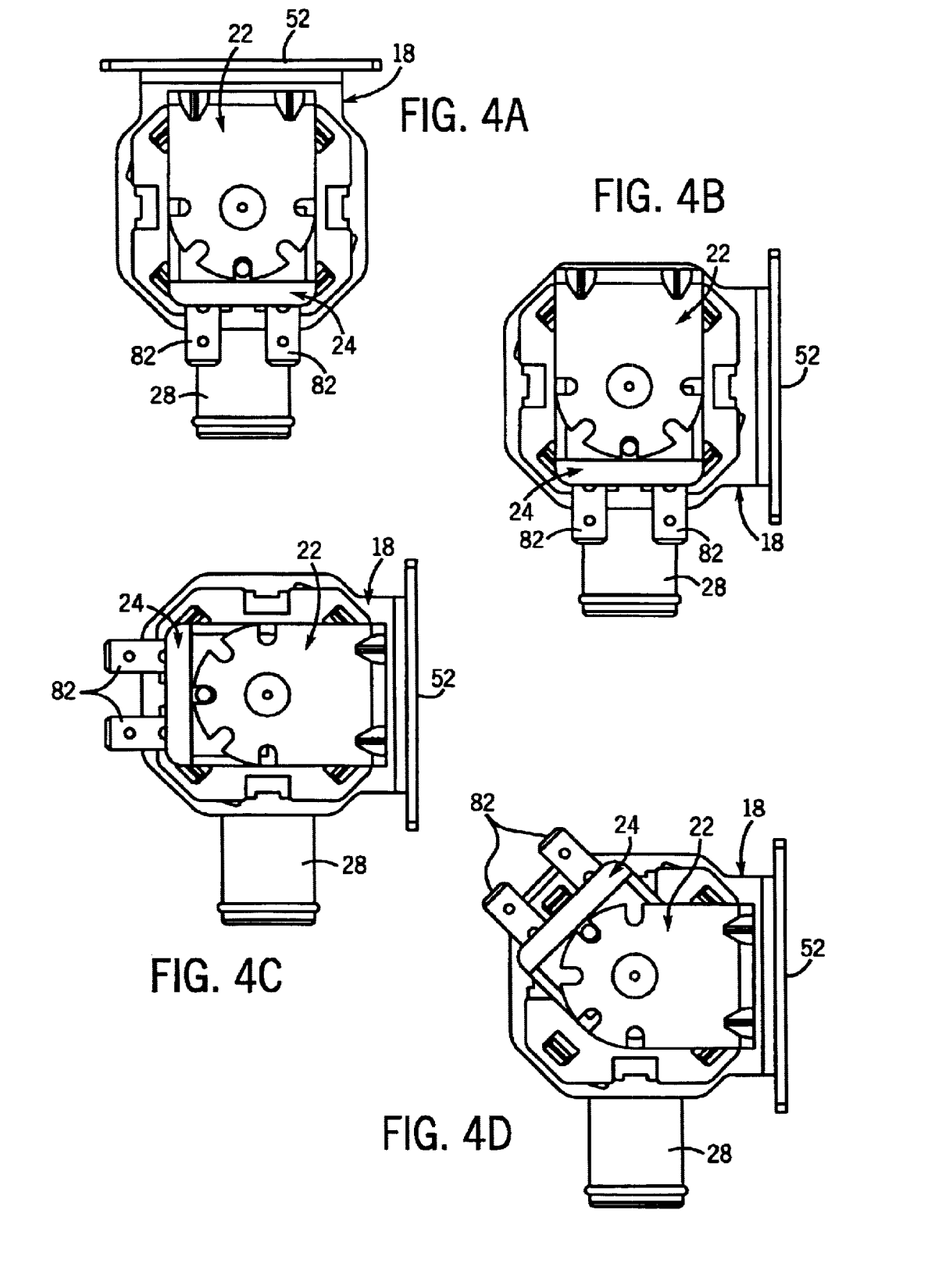
FIGS. 4A through 4D are various plan views of different configurations of the liquid dispensing valve.

According to the construction set forth above, the valve 10 may be assembled faster without threaded fasteners or tools into a variety of configurations. For example, FIG. 4A portrays a plan view of one variation wherein the attachment portion 52 of mounting bracket 18 is 180 degrees spaced from the forward position of the solenoid terminals 82 overlying the inlet 28. FIG. 4B shows a mounting bracket 18 rotated 90 degrees clockwise from the assembly in FIG. 4A. FIG. 4C illustrates the valve 10 with the mounting bracket 18 in position like FIG. 4B but with the subassembly of the snap plate 20, frame 22 and solenoid 24 rotated clockwise relative to the subassembly in FIG. 4B. FIG. 4D depicts a valve similar to FIG. 4C but shows solenoid 24 rotated 36 degrees clockwise relative to the frame 22.

Because of the interengageable attachment structure, engagement structure, notch structure, detent structure and leg and pin structure on the valve body 12, the mounting bracket 18 and the snap plate subassembly, the valve 10 is able to present a modular construction which is easily assembled and disassembled by registering the various valve components together and twisting them together one way or another into and out of the snap fit. Inspection, repair and replacement of valve components is markedly simplified.

While the invention has been described with reference to a preferred embodiment, those skilled in the art will appreciate that certain substitutions, alternations and omissions may be made without departing from the spirit thereof. Accordingly, the foregoing description is meant to be exemplary only, and should not be deemed limitative on the scope of the invention set forth with the following claims.

We claim:

1. In a solenoid valve having a valve body with an inlet and an outlet and a valve seat therebetween, a valve member selectively engageable with the valve seat for controlling the flow of fluid from the inlet to the outlet, a biasing device engageable with the valve member for holding the valve member against the valve seat, and a solenoid assembly mounted upon the valve member for moving the valve member away from the valve seat, the improvement comprising:

a mounting arrangement interposed between and connecting the valve body and the solenoid assembly in a rotary, frictional engagement,     wherein the mounting arrangement includes a mounting bracket positioned upon the valve body, and a snap plate located between the solenoid assembly and the mounting bracket.

2. The improvement of claim 1, wherein the mounting arrangement is free of threaded fasteners.

3. The improvement of claim 1, wherein the solenoid assembly includes a solenoid and a frame for movably holding the solenoid, the frame being attached to the snap plate.

4. The improvement of claim 1, wherein the valve body includes attachment structure for permitting joinder of the mounting bracket, the snap plate and the solenoid assembly.

5. The improvement of claim 4, wherein the mounting bracket includes engagement structure cooperable with the attachment structure on the valve body.

6. The improvement of claim 5, wherein the snap plate includes leg and pin structure passable through the engagement structure on the mounting bracket and engageable with the attachment structure on the valve body.

7. The improvement of claim 3, wherein the frame includes a notch structure for defining various rotational positions for the solenoid.

8. The improvement of claim 7, wherein the solenoid has detent structure selectively engageable with the notch structure on the frame.

9. A modular, solenoid operated, liquid dispensing valve comprising:

a valve body having an inlet and an outlet for respectively introducing liquid into and delivering liquid out of the valve body, and a valve seat between the inlet and the outlet;

a valve member selectively engageable with the valve seat for controlling the flow of liquid from the inlet to the outlet;

a biasing device engageable with the valve member for holding the valve member against the valve seat;

a solenoid assembly mounted upon the valve body for selectively moving the valve member in a direction away from the valve seat; and     a mounting bracket positioned between the valve body and the solenoid assembly for supporting the solenoid thereon,     wherein at least the mounting bracket is removably connected to the valve body by a twist, snap fit.

10. The valve of claim 9, wherein the solenoid assembly is also removably connected to the valve body by a twist, snap fit.

11. The valve of claim 9, wherein the solenoid assembly includes a solenoid, a frame for holding the solenoid and a snap plate attached to the frame.

12. The valve of claim 11, wherein the valve body includes an open upper end terminating in a neck having a radially extending crown provided with a raised surface arrangement in the form of a series of lands located on an outer perimeter of the crown, each land having a ridge at one end running along the neck, and a narrow wall at another end extending from the neck to the outer perimeter.

13. The valve of claim 12, wherein each ridge on the valve body includes an L-shaped, mounting bracket receiver rising above the neck.

14. The valve of claim 13, wherein the raised surface arrangement includes a series of spaced apart cavities, each cavity being formed by surrounding surfaces of each land, ridge and narrow wall, each cavity having an expanded end and a narrowed end.

15. The valve of claim 14, wherein a nook is provided between each ridge and each narrow wall to facilitate securement of the mounting bracket to the valve body.

16. The valve of claim 15, wherein a flat is provided between each adjacent pair of lands outwardly of each ridge.

17. The valve of claim 16, wherein the mounting bracket has an attachment portion and a base integrally formed therewith, the base being formed with a central void in registration with the open upper end of the valve body.

18. The valve of claim 17, wherein the base includes a set of curved guide slots and a group of pockets for enabling attachment of the solenoid assembly.

19. The valve of claim 18, wherein the base further includes radially innermost, neck encircling surfaces between the slots and the central void, each innermost surface being formed with a dimple frictionally engageable in a respective nook upon rotation of the mounting bracket relative to the valve body.

20. The valve of claim 18, wherein each of the pockets has an enlarged end and an opposite niched end movable into engagement with a respective L-shaped mounting bracket receiver on the valve body.

21. The valve of claim 20, wherein each L-shaped mounting bracket receiver and each ridge form a slot for receiving a niched end of each pocket upon rotation of the mounting bracket relative to the valve body.

22. The valve of claim 20, wherein the cavities in valve body crown are aligned with the pockets and the mounting bracket.

23. The valve of claim 18 wherein the flats on valve body crown are in registration with the curved guide slots in the mounting bracket.

24. The valve of claim 22, wherein the snap plate includes a set of locating pins depending therefrom, each locating pin having a top end provided with a tang having a ramping surface.

25. The valve of claim 24, wherein the snap plate also includes a group of attachment legs depending therefrom, each leg having a length greater than the length of the locating pins, each leg having a barbed lower end engageable with the valve body.

26. The valve of claim 25, wherein the attachment legs on the snap plate are inserted through the enlarged ends of the mounting bracket pockets and the expanded ends of the valve body cavities which are aligned with the pockets, and the locating pins are positioned in leading ends of the mounting bracket curved guide slots for movement over the aligned valve body flats.

27. The valve of claim 26 wherein the attachment legs on the snap plate are movable into frictional engagement with walls on the narrowed ends of the cavities upon rotation of the snap plate relative to the mounting bracket.

28. The valve of claim 17, wherein the snap plate has a central bore aligned with the mounting bracket central void and the open upper end of valve body.

29. The valve of claim 24, wherein the frame has a bottom end plate, a top end plate and a connector plate joining the bottom end plate and the top end plate.

30. The valve of claim 29, wherein the bottom end plate is formed with a plurality of recesses for receiving the tang ramping surfaces of the snap plate locating pins such that tangs will be snapped against wall surfaces forming the recesses.

31. The valve of claim 29, wherein the top end plate is formed with a plurality of notches, and the solenoid is provided with a nib which is received in one of the notches.

32. The valve of claim 29, wherein the solenoid is rotatably mounted on the bottom end plate and the top end plate of the frame.

33. The valve of claim 32, wherein a spring washer is interposed between a bottom of the solenoid and an upper surface of the bottom end plate, the spring washer providing a force tending to hold the nib in one of the notches, the force being overcome to enable the nib to be positioned in another of the notches so as to vary the rotational position of the solenoid relative to the frame.

34. A method of assembling a solenoid valve comprising the steps of:

a) providing a valve body having an inlet and an outlet for controlling fluid through the valve body, and a valve seat between the inlet and the outlet;

b) providing a valve member selectively engageable with the valve seat for controlling flow of fluid from the inlet to the outlet;

c) providing a biasing device engageable with the valve member for holding the valve member against the valve seat;

d) providing a solenoid assembly mounted upon the valve body for selectively moving the valve member in a direction away from the valve seat, the solenoid assembly including a solenoid in a frame for holding the solenoid therein;

e) providing a mounting bracket to be positioned between the valve body and the solenoid assembly;

f) connecting the mounting bracket to the valve body by means of a first twisting, snap fit; and g) connecting the solenoid assembly to the mounting bracket and the valve body by means of a second twisting snap fit, whereby rotational position of the mounting bracket relative to the valve body and rotational position of the solenoid assembly relative to the valve body and the mounting bracket are variably adjustable.

35. The method of claim 34, including the step of rotatably mounting the solenoid relative to the frame, the mounting bracket and the valve body.

\* \* \* \* \*